United States Patent [19]

Norris

[11] Patent Number: 4,552,676

[45] Date of Patent: Nov. 12, 1985

[54] COMPOSITION AND METHOD FOR LUBRICATING INSULATED ELECTRICAL CONDUCTORS

[76] Inventor: Henry F. Norris, 1506 Main St., Whiteford, Md. 21160

[21] Appl. No.: 428,191

[22] Filed: Sep. 29, 1982

[51] Int. Cl.$^4$ .......................... C10M 7/48; C10M 7/52
[52] U.S. Cl. ......................... 252/20; 252/21; 252/28; 252/18; 252/40.7; 254/134.3 FT
[58] Field of Search ....................... 252/20, 21, 18, 28, 252/40.7; 254/134.3 FT

[56] References Cited

U.S. PATENT DOCUMENTS

| | | | |
|---|---|---|---|
| 2,736,699 | 2/1956 | Carhart | 252/21 |
| 3,371,038 | 2/1968 | Wieser et al. | 252/28 |
| 4,202,530 | 5/1980 | Conti | 254/134.3 FT |
| 4,308,182 | 12/1981 | Eckard et al. | 252/18 |
| 4,337,922 | 7/1982 | Streiff et al. | 254/134.3 FT |

*Primary Examiner*—Jacqueline V. Howard
*Attorney, Agent, or Firm*—Marvin S. Towsend

[57] ABSTRACT

A lubricating composition and method are disclosed for lubricating the inner wall of a hollow conduit and the outer surface of an insulated flexible electrical conductor installed in the conduit. The lubricating composition is a powder comprised of the following powdered ingredients: lubricant such as talc; drying agent such as a micron-mesh silica; surfactant such as calcium stearate; odorant such as sassafras; and colorant such as a non-toxic food or cosmetic dye. The lubricating method first includes the step of blowing a quantity of a powdered lubricating composition into a hollow conduit resulting in the deposition of powdered lubricant on the inner wall of the conduit. In the next step of the method, an insulated flexible electrical conductor is inserted into the pre-lubricated conduit whereby powdered lubricant on the inner wall of the conduit rubs off onto the outer surface of the insulation of the electrical conductor thereby lubricating the insulation as it advances through the conduit.

4 Claims, No Drawings

4,552,676

COMPOSITION AND METHOD FOR LUBRICATING INSULATED ELECTRICAL CONDUCTORS

BACKGROUND OF THE INVENTION

The present invention relates to techniques used in the construction industry for installing insulated electrical conductors inside hollow conduits. In particular, the invention relates to lubricant compositions and methods of use for lubricating the insulated flexible electrical conductors to facilitate installation inside hollow conduits.

It is well known that building and fire codes require that insulated flexible electrical conductors be housed inside rigid hollow conduits so as to protect the conductors from excessive flexing and fatigue over time. The hollow conduits also serve to protect the insulated flexible conductors from exposure to the immediate environment surrounding the hollow conduit.

A common problem associated with installing the insulated conductor inside the conduit is the impediment to installation created by the friction between the inner wall of the conduit and the insulation of the conductor. The friction both slows down the installation process and may even prohibit conductor installation beyond a certain limit.

Previously, liquid, paste, or gel lubricants have been applied to the outer surfaces of the electrical insulation prior to insertion into the hollow conduit in order to reduce the friction that is encountered. Generally, the lubricants are of a petroleum base and are characterized by certain undesirable aspects such as being messy to apply and creating a time consuming and wasteful clean up process. In addition, the waste in time for cleaning up is accompanied by a concomitant waste in lubricant material that results from using liquid lubricants. In order to assure a constant presence of a lubrication layer between the outer surface of the electrical insulation and the inner wall of the hollow conduit, the lubricant composition must be applied either continuously or periodically to the insulation prior to its advancement and entrance into the hollow conduit. Thus, both time and attention to lubricating the insulation must be expended as this technique is employed.

SUMMARY OF THE INVENTION

Accordingly, it is an object of the present invention to provide a lubricant for installing an insulated electrical conductor inside a hollow conduit which is not messy to apply.

Another object of the invention is to provide a lubricant which requires less clean-up after its being used for installing the electrical conductor inside the conduit.

Another object of the invention is to provide a method for using a lubricant whereby continuous or periodic application of the lubricant to the insulation of the conductor prior to its being inserted into the conduit is not required.

Additional objects, advantages, and novel features of the invention will be set forth in part in the description that follows and in part will become apparent to those skilled in the art upon examination of the following or may be learned with practice of the invention. The objects and advantages of the invention may be realized and obtained by means of the instrumentalities and combinations particularly pointed out in the appended claims.

To achieve the foregoing and other objects, and in accordance with the purposes of the present invention as described herein, as improved lubricant composition is provided for facilitating the installation of an insulated electrical conductor inside a hollow conduit. The novel lubricant composition is a powder and is comprised of a powdered lubricant; a powdered drying agent for maintaining the powdered lubricant in a powdery state; and a powdered surfactant for assuring a homogeneous blend of the powdered ingredients and for adding to the lubricating properties of the lubricating composition. The powdered drying agent is present preferably in the range from 0.1 to 1%; the powdered surfactant is present preferably in the range from 2–6%; and the difference from 100% being the powdered lubricant.

A suitable powdered drying agent is a micron-mesh silica; a suitable powdered surfactant is a salt of a fatty acid; and a suitable powdered lubricant in talc. Additional ingredients may be added to the composition. For example, a powdered colorant may be added; and, in addition, a powdered odorant. The powdered colorant may be present in the range from 0.1–1%; and the powdered odorant may be present in the range from 0.1–1%.

In a further aspect of the invention, in accordance with its objects and purposes, a method of applying a powdered lubricant to the interior of a hollow conduit and to the surface of an insulated flexible electrical conductor installed in the conduit is provided. The method comprises the steps of blowing the powdered lubricant composition into the conduit, for example by using compressed air, resulting in deposition of powdered lubricant along the interior wall of the conduit; and installing the insulated conductor in the conduit whereby powdered lubricant from the interior wall of the conduit is deposited on the surface of the insulated conductor when the conductor is inside the conduit.

By employing the powdered lubricant composition of the invention, there is not any messy clean up procedure that must be followed with its attendant wasting of time and material. By employing the method of blowing lubricant powder into the interior of a conduit, there is no need to apply the lubricant composition to the insulated electrical conductor when it is outside the conduit because the powdered lubricant blown inside the conduit will deposit on the surface of the electrical insulation as it is installed inside the conduit. Thus, the need for continuous or periodic application of a lubricant to the insulation of the electrical conductor prior to installation in the conduit is eliminated.

DETAILED DESCRIPTION OF THE INVENTION

The basic powdered lubricant composition of the invention comprises three ingredients: powdered lubricant; powdered drying agent; and powdered surfactant. It has been determined that additional ingredients are desirable to provide esthetic qualities to the composition. Thus, addition of a powdered colorant and a powdered odorant are desirable. The preferred powdered lubricant is talc e.g. 200 mesh. The preferred powdered drying agent is a micron-mesh silica such as Syloid 244 manufactured by the Davison Chemical Division of W. R. Grace and Company, Baltimore, Md. The drying agent serves to keep the talc dry and thereby enable it to retain its powdery consistency. The powdered surfactant is preferably a alkali metal or alkaline earth metal salt of a fatty acid e.g. calcium stearate. The surfactant serves both to enable a homogeneous blending of all the lubricating composition and, in addition, serves to provide further lubricating properties.

The preferred powdered colorant is a nontoxic blue dye e.g. FD&C #5516. The preferred powdered odorant is powdered sassafras.

EXAMPLE

A representative formulation of the powdered lubricating composition of the invention is obtained by blending 3,610 cc. of talc (200 mesh); 15.6 cc. powdered sassafras; 19 cc. Syloid 244; 152 cc. calcium stearate powder; and 136 cc. blue dye FD&C #5516. The powdered ingredients may be blended by any conventional powder blending technique to result in a lubricating composition powder of the invention.

The preceding formulation has the ingredients present in the following weight percentages:

| | |
|---|---|
| powdered drying agent | 0.48% |
| powdered surfactant | 3.86% |
| powdered colorant | 3.46% |
| powdered odorant | 0.40% | and the difference from 100% being the powdered lubricant in the amount of 91.80%.

The powdered lubricant composition of the invention is suitable for applying to the outer surface of an insulated electrical conductor as it is being installed into a hollow conduit. Any conventional method of applying a powder to a substrate may be used, for example, brushing or spraying. It is contemplated that the powdered lubricating composition of the invention may be packaged in an aerosol container and may be readily sprayed onto the surface of the insulation as the insulated flexible electrical conductor is installed in the hollow conduit.

Another aspect of the invention relates to a novel method for applying lubricant to the outer surface of the insulated conductor as it moves through the interior of the hollow conduit. In accordance with the novel method of the present invention, a powdered lubricant composition of the invention is blown into the hollow conduit prior to the installation of the insulated electrical conductor. The interior walls of the conduit are deposited with a layer of the powdered lubricant composition prior to installation of the insulated conductor. Then the insulated conductor is installed in the conduit, and as the surfaces of the insulation contact the inner wall of the conduit, powdered lubricant rubs off from the interior wall and is deposited on the surface of the insulated conductor. Thereby powdered lubricant is applied to the surface of the electrical conductor after its insertion into the hollow conduit, and the need for applying lubricant to the insulation of the conductor prior to its insertion into the conduit is eliminated. When this method is employed, the powdered lubricating composition is essentially retained inside the hollow conduit; and there is virtually no mess to clean up such as occurs when a lubricant is applied to insulation on a conductor when it is outside of a conduit prior to its insertion into the conduit.

The foregoing description of preferred embodiments of the composition of the invention and the method of the invention has been presented for purposes of illustration and description. It is not intended to be exhaustive or to limit the invention to the precise form disclosed. Obvious modifications and variations are possible in light of the above teachings. The embodiments were chosen and described in order to best illustrate the principles of the invention and their practical application thereby enabling one of ordinary skill in the art to best utilize the invention in various embodiments and with various modifications as are suited to the particular use contemplated. It is intended that the scope of the invention be defined by the claims appended hereto.

What is claimed is:

1. A lubricating composition for installing an insulated electrical conductor in a conduit wherein: the ingredients are present in the following weight percentages:

| | |
|---|---|
| powdered drying agent which is micron-mesh silica | 0.1 to 1%; |
| powdered surfactant which is a salt of a fatty acid | 2 to 6%; | and the difference from 100% being powdered lubricant which is talc.

2. A composition as described in claim 1 further comprising:
   powdered colorant in the range from 0.1% to 1%; and
   powdered odorant in the range from 0.1 to 1%;
   wherein the ingredients are present in the following weight percentages:

| | |
|---|---|
| [a] micron-mesh silica | 0.48% |
| said surfactant is calcium stearate | 3.86% |
| said powdered colarant is FD & C #5516 | 3.46% |
| said powdered odorant is sassafrass | 0.40% | and the difference from 100% being said powdered lubricant which is powdered talc.

3. A method for installing an insulated electrical conductor in a conduit comprising the step of lubricating the insulated electrical conductor with a powdered composition having the ingredients in the following weight percentages:

| | |
|---|---|
| powdered drying agent which is micron-mesh silica | 0.1 to 1%; |
| powdered surfactant which is a salt of a fatty acid | 2 to 6%; | and the difference from 100% being the powdered lubricant talc.

4. A method as described in claim 3 further comprising:
   powdered colorant; and
   powdered odorant;
   wherein the ingredients of the powdered composition are present in the following weight percentages:

| | |
|---|---|
| micron-mesh silica | 0.48% |
| powdered surfactant is calcium stearate | 3.86% |
| powdered colorant is FD & C #5516 | 3.46% |
| powdered odorant is sassafras | 0.40% |
| and powdered lubricant is talc | 91.80% |

* * * * *